(12) United States Patent
Johnson

(10) Patent No.: US 6,823,698 B2
(45) Date of Patent: Nov. 30, 2004

(54) ROTARY FIBERIZATION SPINNER DISC

(75) Inventor: Walter A. Johnson, Centennial City, CO (US)

(73) Assignee: Johns Manville International, Inc., Denver, CO (US)

( * ) Notice: Subject to any disclaimer, the term of this patent is extended or adjusted under 35 U.S.C. 154(b) by 348 days.

(21) Appl. No.: 10/023,180

(22) Filed: Dec. 17, 2001

(65) Prior Publication Data
US 2002/0116958 A1 Aug. 29, 2002

Related U.S. Application Data
(60) Provisional application No. 60/257,158, filed on Dec. 22, 2000.

(51) Int. Cl.[7] ............................................... C03B 37/04
(52) U.S. Cl. ..................... 65/492; 65/314.12; 65/521
(58) Field of Search ............................. 65/492, 374.12, 65/521

(56) References Cited

U.S. PATENT DOCUMENTS

| | | | | |
|---|---|---|---|---|
| 3,600,146 A | * | 8/1971 | Jensen | 65/493 |
| 3,859,070 A | * | 1/1975 | Slonaker | 65/493 |
| 3,881,918 A | * | 5/1975 | Costin et al. | 420/440 |
| 4,402,767 A | * | 9/1983 | Hinze et al. | 148/653 |
| 4,532,184 A | * | 7/1985 | Schuster | 428/433 |
| 5,002,834 A | * | 3/1991 | Smith et al. | 428/552 |
| 5,118,581 A | * | 6/1992 | Shalaby | 428/433 |
| 5,725,691 A | * | 3/1998 | Liu | 148/409 |
| 5,914,439 A | * | 6/1999 | McGarry | 65/493 |
| 5,983,675 A | * | 11/1999 | McDonald | 65/66 |

* cited by examiner

Primary Examiner—John Hoffmann
(74) Attorney, Agent, or Firm—Robert D. Touslee

(57) ABSTRACT

Spinner discs for use in the fiberization of glass in rotary fiberization processes are made of intermetallic compounds of aluminides of nickel ($Ni_3Al$ and $NiAl$).

1 Claim, 1 Drawing Sheet

ROTARY FIBERIZATION SPINNER DISC

BACKGROUND OF THE INVENTION

This patent application is a continuation-in-part of provisional patent application Ser. No. 60/257,158, filed Dec. 22, 2000.

The present invention relates to high temperature resistant metallurgy for improving the spinner discs utilized in high temperature rotary glass fiberization processes. These processes produce glass fibers through the extrusion of high temperature molten glass through fiberizing orifices in the peripheral sidewalls of the spinner discs. More specifically, the invention relates to the formation of these spinner discs from high temperature resistant aluminide of nickel alloys, i.e. $Ni_3Al$ and $NiAl$ alloys, rather than the expensive cobalt alloys currently used to make such spinners. The aluminide of nickel alloys of the spinner discs of the present invention exhibit sufficient strength and ductility at room temperature to withstand the harsh thermal shock encountered by these spinner discs during process start-up. At the elevated temperatures utilized in these processes (temperatures in excess of 1800° F.), the aluminide of nickel alloys of the spinner discs of the present invention exhibit creep strengths comparable to the creep strengths of the cobalt alloys presently in use and hot corrosion resistances superior to the hot corrosion resistances of the cobalt alloys presently in use.

High temperature rotary glass fiberization processes fiberize molten glass by using centrifugal force to pass the molten glass through rows of fiberizing holes in an annular peripheral sidewall of a spinner disc. These fiberization processes typically fiberize the molten glass at temperatures in excess of 1800° F. The base plate of a spinner disc has a central bore therein on a rotational axis of the spinner disc for mounting the spinner disc on a drive shaft; an outer annular portion for receiving the hot molten glass to be fiberized; and an inner annular portion intermediate the central bore and the outer annular base plate portion. The spinner disc is normally preheated during the start-up of such high temperature fiberizing operations to reduce the stresses in the spinner disc at the start-up of a fiberizing operation. However, during start-up when the hot molten glass at temperatures in excess of 1800° F. is first introduced onto the outer annular portion of the spinner disc base plate, the temperature differential between the outer annular portion of the base plate and the inner annular portion of the base plate, adjacent the central bore, can be in excess of 800° F. or 900° F. with the temperature of the outer annular portion of the base plate about 1400° F. and the temperature of the inner annular portion of the base plate, adjacent the central bore, about 500° F. This transient temperature differential at start-up sets up transient compressive stresses in the outer annular portion of the base plate and transient tensile stresses in the inner annular portion of the base plate which can cause the base plate of the spinner disc to rupture, come apart or fail and, thus, the spinner disc, which is typically rotating at thousands of revolutions per minute, to fail at the start-up of the fiberizing operation. The potential for such failures presents both operational and safety problems in a commercial production line. Accordingly, an alloy used in the fabrication of such spinner discs should have a yield strength capable of withstanding the high initial transient stresses produced in the spinner disc during start-up.

In addition to having a yield strength that enables the spinner discs made from the alloy to withstand the high initial transient stresses at start-up, the alloy of spinner discs used these high temperature rotary fiberization processes must exhibit creep strengths and corrosion resistances at the elevated temperatures of these processes that provide these spinner discs with a commercially acceptable service life.

Currently, elevated temperature resistant cobalt based alloys are typically used for spinner discs in rotary glass fiberization processes. The cobalt alloys are used for this application due to their superior performance when compared to similar iron based alloys and nickel based alloys without aluminum. When compared to similar iron based alloys and nickel based alloys, without aluminum, at the elevated temperatures utilized in these glass fiberization processes, these cobalt based alloys exhibit superior strength and creep resistance as well as improved elevated temperature corrosion resistance.

The cobalt based alloys used in these spinner discs consist of a strong and corrosion resistant Co—Cr matrix, which is further strengthened, with a dispersion of coarse, strong carbides. Carbides in the microstructures are second phase strengtheners, the bulk of which are produced during the casting-solidification process. $Cr_{23}$—$C_6$ represent the dominant carbide by volume, however, $Mo_xC_y$ carbide also forms. The Mo carbides tend to be more thermally stable, they melt at higher temperatures, yet the process of Mo can be extremely detrimental in certain hot corrosion, sulfidation environments, because it alters corrosion product chemistry and accelerates corrosion. While these carbides are strong and impart improved elevated temperature strength to the cobalt based alloys, they also provide a short circuit path for oxidation, sulfidation, and other forms of elevated temperature corrosion. The carbides have another detrimental feature in that these carbides are the last "portion" of the microstructure to freeze and the first to melt. Hence, for the components contained in the alloy, the phase relied upon for strength melts at the lowest temperature thereby limiting the maximum useful service temperature of the alloy.

Spinner discs fabricated from cobalt-based alloys have a service life ranging from about 35 to about 55 hours. The cobalt based alloys utilized in the fabrication of these spinner discs typically cost in excess of $15.00 per pound and, since they are uniquely formulated to meet the demanding service requirements of glass fiberization, these alloys are worth very little as scrap. To reduce costs manufacturers recycle the alloy and maintain an alloy pool of the specifically formulated cobalt alloy. However, since the alloy acquires impurities during service, the alloy must be refined before it can again be incorporated into the alloy pool. Thus, the manufacturer incurs the expense of maintaining an alloy pool and of refining alloy to be included in the alloy pool from spent spinner discs. With the relatively short service life of these spinner discs and the number of spinner discs utilized on various production lines, the amount of alloy required to maintain an adequate alloy pool for disc fabrication and the expenses incurred in connection with such alloy pools are significant.

For the aforementioned reasons, alloy design and development becomes an engineering trade-off between structure-property-performance-process and alloy costs. Structure-property-performance-process trade-offs must be optimized to attain the best alloy environmental properties (corrosion resistance to the molten glass being fiberized at the elevated temperatures in the fiberizing environment) and the best alloy mechanical properties both at room temperature for startup and at the elevated fiberizing temperatures. The use of relatively low cost alloys with these enhanced environmental properties and mechanical properties will result in optimized disc service life and performance at lower manufacturing costs.

SUMMARY OF THE INVENTION

Attempts to develop new relatively inexpensive alloys to improve spinner disc service life are challenging, as corrosion and oxidation resistance, mechanical properties and alloy costs must be properly balanced. In the aluminide of nickel alloy of the spinner discs of the present invention, the use of intermetallic compounds of aluminides of nickel, i.e. $Ni_3Al$ and $NiAl$, offers the ability to strengthen the alloy with phases other than carbides, which, as discussed above, selectively corrode relative to the matrix. In addition, cast aluminides of nickel produce a more homogeneous alloy compared to cobalt alloys and an alumina corrosion resistant film, both of which provide enhanced corrosion and oxidation resistance and improved disc performance.

During the development of the aluminide of nickel alloys for the spinner discs of the present invention, aluminide chemistries were evaluated with the specific intent to increase the nobility of the alloy (the ability of the alloy to form a protective oxide surface film) and the overall elevated temperature corrosion resistance of the alloy in molten glass. It was discovered that unlike their stainless steel counterparts, aluminides were corrosion resistant, with the addition of aluminum, due to the increased alloy nobility and the formation of a strong thin $Al_2O_3$ barrier film between the alloy and its environment. Stainless steels are protected by the addition of chromium to the alloy and $Cr_2O_3$ film formation. $Al_2O_3$ barrier film formation requires adequate oxygen to be present in the environment so that the alloy can form a strong, thin, and continuous $Al_2O_3$ barrier film. When oxygen is insufficient, the film formed in not continuous or protective and the alloy can more quickly corrode. The latter scenario most closely fits alloy behavior in a glass environment and thus, would appear to be a major concern when contemplating the use of aluminides of nickel alloy in the fabrication of spinner discs. However, by preheating the spinner discs in an oxygen rich environment prior to the introduction of molten glass into the spinner during the manufacturing process, a strong thin continuous $Al_2O_3$ barrier film is formed on the surfaces of the spinner disc, including the surfaces of the fiberizing holes. If the $Al_2O_3$ barrier film, formed prior to the introduction of the molten glass into the fiberizing discs, develops a discontinuously or breaks during service, it will be difficult for the barrier film to reform and heal itself. However, in view of tests discussed below, the aluminides of the present invention are believed to exhibit excellent elevated temperature corrosion resistance.

As discussed above, alloy design within the actual engineering process envelope is essential to alloy development success. To determine if the aluminide nickel alloys of the spinner discs of the present invention exhibited environmental and mechanical properties equivalent of superior to current cobalt based alloys used in spinner discs, preliminary alloy screening for the aluminide of nickel alloy of the present invention was accomplished through the use of the following laboratory tests: elevated temperature corrosion tests in molten glass at temperatures in excess of 2000° F. to determine the corrosion resistance of the alloy; tensile tests at room temperature (72° F. to 78° F.) to determine the room temperature strength and ductility of the alloy; and tensile tests at elevated temperatures in excess of 2000° F. to determine the elevated temperature yield and ultimate tensile strengths of the alloy.

The aluminide of nickel alloys of the spinner disc of the present invention must exhibit strength equivalent or superior to cobalt based alloys currently in use. Larson-Miller stress rupture plots indicate that this is the case for the aluminide of nickel alloy of the present invention. The reason this short duration mechanical test approach works as an effective alloy screening test in these spinner disc applications, while it has often proven ineffective in other applications, relates to the duty cycle for these spinner discs, which can be summarized effectively as exposure to a high temperature, high stress, and high corrosion environment for a relatively short time period. Engineering application of materials demands that material structure-property-performance-process fit the engineering process envelope. The aforementioned relatively short duty cycle for spinner discs made from the alloy of the present invention will tolerate a set of designed materials properties that are significantly different from those of a longer duty cycle, e.g. the set of design materials properties for a 50-hour spinner disc service life when compared to a 5,000-hour turbo machinery service life can be significantly different.

From the above tests, it was determined that the aluminide of nickel alloys of the spinner discs of the present invention provide superior elevated temperature corrosion resistance when compared to a bench mark cobalt based alloy currently in use; provides comparable room temperature strength and ductility when compared with the bench mark cobalt based alloy; and comparable elevated temperature yield and ultimate tensile strengths when compared to the bench mark cobalt based alloy.

The aluminide of nickel alloys of the spinner discs of the present invention cost about $5.00 per pound and offers a viable and excellent material for the fabrication of spinner discs used in the fiberization of glass fibers. The economics of using the aluminide of nickel alloy of the present invention for the fabrication of spinner discs are quite advantageous. As discussed above, due to the relatively high costs and unique compositions of cobalt based alloys, the use of spinner discs fabricated from cobalt-based alloys require the maintenance of an alloy pool with the associated refining of the alloy to remove impurities acquired by the alloy during service. To be cost effective, the relatively inexpensive aluminide of nickel alloys of the present invention can simply be compounded, melted and poured into a mold to cast the spinner disc. Once the spinner disc is spent, the alloy in the spinner disc can be sold as scrap. Thus, unlike currently used cobalt based alloys, the use of the aluminide of nickel alloy of the present invention for spinner discs does not require the maintenance of an alloy pool or the refining of alloy from spent spinner discs. With its elimination of a refining step and the need for an alloy pool, the process of making spinner discs using the aluminide of nickel alloys of the present invention is therefore more straight-forward and less expensive.

DESCRIPTION OF THE PREFERRED EMBODIMENT

Figure 1:
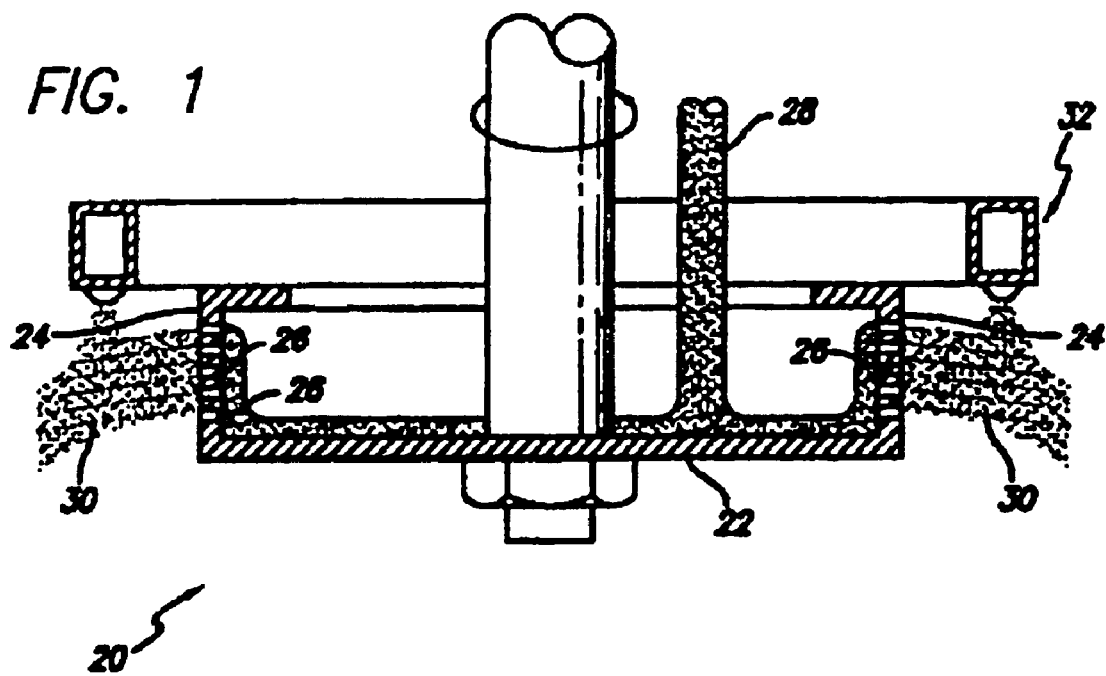
FIG. 1 is a schematic vertical section through a fiberizing station for fiberizing molten glass.

The aluminide of nickel alloys of the spinner discs of the present invention ($Ni_3Al$ and $NiAl$ alloys) are especially suited for use in the spinner discs of rotary fiberization processes used to fiberize molten glass into fibers. As shown in FIG. 1, a spinner disc 20 for fiberizing molten glass in such a rotary fiberizing process has a bottom disc plate 22 and an annular peripheral sidewall 24 integral with and extending upward from the bottom disc plate. The annular peripheral sidewall 24 has thousands of fiberizing holes 26 therein that are typically arranged in a series of annular rows. The rapid rotation of the spinner disc 20, at several thousand revolutions per minute, causes molten glass 28 that is introduced into the spinner disc to pass by centrifugal force through the fiberizing holes to form glass fibers 30. Typically, the fibers 30 produced by passing the molten glass through the rows of fiberizing holes 26 in the spinner disc 20 are further attenuated by an annular curtain of hot, high velocity products of combustion and/or a high velocity annular curtain of air, steam, etc., discharged from an annular burner or manifold assembly and/or an annular air ring 32. The spinner disc 20 operates in an environment having a temperature of about 1800° F. or greater and preferably, is fabricated in a molding process.

The preferred Ni$_3$Al aluminide of nickel alloy compositions of the spinner discs of the present invention that were tested and discussed in the summary of the invention utilized alloys made from virgin alloy heats (virgin heats) and scrap alloy heats (revert heats) that fall within the following ranges by weight percent:

| Element | Nominal (wt %) | Virgin Heats (wt %) Range | Virgin Heats (wt %) Average | Revert Heats (wt %) Range | Revert Heats (wt %) Average |
|---|---|---|---|---|---|
| Al | 8.0 | 7.500–8.200 | 7.860 | 7.300–8.300 | 7.740 |
| Cr | 7.7 | 7.630–8.110 | 7.810 | 7.560–8.500 | 7.880 |
| Mo | 1.43 | 1.380–1.500 | 1.450 | 1.340–1.560 | 1.430 |
| Zr | 1.70 | 1.730–2.020 | 1.930 | 1.620–2.050 | 1.860 |
| B | 0.0080 | 0.004–0.008 | 0.005 | 0.003–0.008 | 0.005 |
| C | — | 0.012–0.032 | 0.022 | 0.010–0.050 | 0.024 |
| Si | — | 0.021–0.055 | 0.036 | 0.026–0.155 | 0.061 |
| Fe | — | 0.030–0.150 | 0.077 | 0.030–0.910 | 0.194 |
| Ni | 81.162 | balance | 80.810 | balance | 80.806 |

The preferred Ni$_3$Al aluminide of nickel alloy compositions of the spinner discs of the present invention that were tested and discussed in the summary of the invention utilized alloys made from virgin alloy heats (virgin heats) and scrap alloy heats (revert heats) that fall within the following ranges by atomic percent:

| Element | Nominal (Atomic %) | Virgin Heats (Atomic %) Range | Virgin Heats (Atomic %) Average | Revert Heats (Atomic %) Range | Revert Heats (Atomic %) Average |
|---|---|---|---|---|---|
| Al | 15.930 | 15.008–16.278 | 15.669 | 14.634–16.423 | 15.438 |
| Cr | 7.956 | 7.923–8.354 | 8.079 | 7.864–8.728 | 8.156 |
| Mo | 0.801 | 0.777–0.837 | 0.813 | 0.755–0.868 | 0.802 |
| Zr | 1.001 | 1.024–1.186 | 1.138 | 0.961–1.200 | 1.097 |
| B | 0.040 | 0.020–0.040 | 0.027 | 0.015–0.040 | 0.027 |
| C | — | 0.054–0.143 | 0.099 | 0.045–0.222 | 0.108 |
| Si | — | 0.040–0.105 | 0.069 | 0.050–0.295 | 0.117 |
| Fe | — | 0.029–0.144 | 0.074 | 0.029–0.870 | 0.187 |
| Ni | 74.27 | balance | 74.033 | balance | 74.069 |

A preferred Ni$_3$Al aluminide of nickel alloy composition for the spinner discs of the present invention falls within the following ranges:

| Element | (Weight %) Range | (Atomic %) Range |
|---|---|---|
| Al | 7.300–8.300 | 14.630–16.427 |
| Cr | 7.600–8.500 | 7.904–8.730 |
| Mo | 1.300–1.600 | 0.733–0.891 |
| Zr | 1.600–2.100 | 0.948–1.229 |
| B | 0.003–0.008 | 0.015–0.040 |
| C | 0.012–0.050 | 0.054–0.222 |
| Si | 0.021–0.160 | 0.040–0.304 |
| Fe | 0.030–0.910 | 0.029–0.870 |
| Ni | 82.134–78.372 | 75.647–71.286 |

NiAl aluminide of nickel alloy compositions for the spinner discs of the present invention are disclosed in U.S. Pat. No. 5,725,691, issued Mar. 10, 1998, fall within the following ranges by atomic percent:

| Element | Atomic % |
|---|---|
| Al | 49.1 ± 0.8 |
| Mo | 1.0 ± 0.8 |
| Nb/Ta/Zr/Hf | 0.7 ± 0.5 |
| B/C | nearly 0 to 0.03 |
| Ni | balance. |

The disclosure of U.S. Pat. No. 5,725,691, issued Mar. 10, 1998, is hereby incorporated herein in its entirety by reference.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A spinner disc for use in the fiberization of glass, comprising:

a spinner disc with a disc shaped bottom wall and an annular peripheral sidewall integral with and extending upward from the disc shaped bottom wall; the annular peripheral sidewall of the spinner disc containing thousands of fiberizing holes; and the spinner disc being made of an aluminide of nickel alloy comprising in atomic percent about:

| Al | 14.630–16.427 |
|---|---|
| Cr | 7.904–8.730 |
| Mo | 0.733–0.891 |
| Zr | 0.948–1.229 |
| B | 0.015–0.040 |
| C | 0.054–0.222 |
| Si | 0.040–0.304 |
| Fe | 0.029–0.870 |
| Ni | 75.647–71.286. |

* * * * *